H. WELCH.
RAKE CLEANER.
APPLICATION FILED FEB. 21, 1914.
1,099,001.
Patented June 2, 1914.
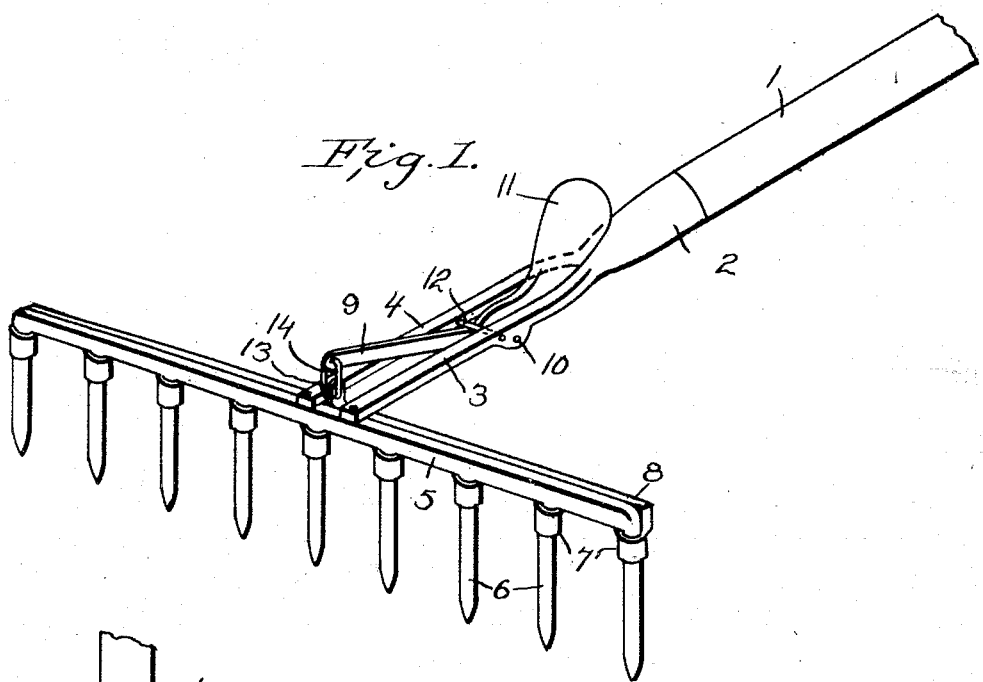
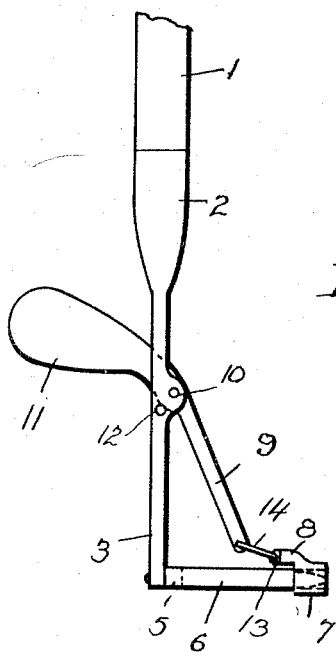
Witnesses
R. N. Jones
Chas. F. Munn
Inventor
H. Welch.
By A. Randolph, Jr.
Attorney

UNITED STATES PATENT OFFICE.

HORACE WELCH, OF SELMA, ALABAMA.

RAKE-CLEANER.

1,099,001.  Specification of Letters Patent.  Patented June 2, 1914.

Application filed February 21, 1914. Serial No. 820,291.

*To all whom it may concern:*

Be it known that I, HORACE WELCH, a citizen of the United States, residing at Selma, in the county of Dallas and State of Alabama, have invented certain new and useful Improvements in Rake-Cleaners; and I do hereby declare the following to be a full, clear, and exact description of the invention, such as will enable others skilled in the art to which it appertains to make and use the same.

My invention relates to new and useful improvements in rake cleaners and resides in the provision of such a device which will strip the teeth of the rake of trash or other foreign matter in a reliable and expeditious manner.

An important object of my invention is to provide a rake cleaner of the character described which will operate as above described to strip the teeth and cleanse the same when the rake handle is moved into a vertical position, and will assume its normal position upon the movement of the rake handle to its usual working position.

Another important object of my invention is to provide a rake cleaner of the character described which will automatically move into operative and inoperative position upon the movement of the rake handle in the different positions and which is extremely simple as to construction, reliable and efficient in operation and cheap to manufacture.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts: Figure 1 is a detail perspective view showing my device in assembled position, and Fig. 2 is a side elevation showing the teeth stripping means in operative or extended position.

Referring to the drawings the numeral 1 designates a handle which is fitted within a socket 2 which carries spaced arms 3 and 4, the free ends of which are secured to the rake head 5. The rake head 5 carries the usual teeth 6.

My improved cleaning means comprises a plurality of stripping sleeves 7 that are slidable on the teeth 6 and carried by a bar 8 that is arranged rearwardly of the sleeves in superposed relation thereto.

An arm 9 is pivoted adjacent to one end as at 10 between the arms 3 and 4. Carried upon the pivoted end of the arm 9 is an elongated weight member 11 which normally holds the outer end of the arm in superposed relation to the head 5 and bar 8. A stop pin 12 is mounted transversely of and between the arms 3 and 4 and is arranged to engage the weight portion 11 when the handle 1 is moved into a vertical position with relation to the ground, as the weight drops toward the forward end of the rake, to limit the movement of the weight 11.

The outer end of the arm 9 is connected to an upstanding eye 13 carried centrally of the ends of the bar 8 by means of a link 14 thus movement of the arm downwardly between the arms 3 and 4 imparts a downward movement to the bar 8 which forces the stripping sleeves 7 downwardly upon the teeth 6.

When it is desired to clean the rake teeth 6 the operator moves the handle 1 of the rake to a vertical or near vertical position so that the weight 11 which normally reposes in engagement with the socket portion 2 is permitted to move downwardly thus the arm 9 moves downwardly between the arms 3 and 4 causing the bar 8 to be moved downwardly and stripping sleeves 7 to slide toward the ends of the teeth 6, thus the trash or other foreign matter which may have collected upon the teeth 6 is removed therefrom in an expeditious manner. The stop pin 12 engages the weight 11 and prevents the sleeve 7 moving off the ends of the teeth 6 as disclosed in Fig. 2 in the drawings. When the handle 1 is moved into the position that it usually assumes when the rake is to perform its usual function, the weight 11 drops back into engagement with the socket 2 and causes the sleeves 7 to be moved upwardly into engagement with the head 5 and out of the way of the teeth 6.

It will be readily seen that the device does not in any way interfere with the usual function of the rake and that the cleaning of the teeth is accomplished in a most expeditious and reliable manner.

It will be readily seen that I have provided a simple and inexpensive rake cleaner which will operate automatically when the rake handle 1 is moved in an upright or vertical position to clean the rake teeth.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to when required, without sacrificing any of the advantages of my invention, as defined in the appended claims.

What is claimed is:—

1. A rake cleaner comprising a supporting bar, a plurality of stripping sleeves mounted upon said bar and slidable on the rake teeth, an arm pivoted on the rake handle and operatively connected at one terminal to said supporting bar and means operatively connected with said arm for automatically moving said stripping sleeves toward the ends of the rake teeth when the rake handle is moved into an upright position.

2. In a rake cleaner the combination with a rake comprising a handle, head, and teeth on said head of a supporting bar, a plurality of stripping sleeves carried on said supporting bar and slidable on said teeth, an arm pivoted on said handle, one end of said arm being pivotally connected with said supporting bar, means carried by said arm for automatically moving the stripping sleeves downwardly upon the teeth when the rake handle is moved into an upright position, and means for limiting the movement of said arm carried by said handle to prevent movement of the sleeves out of engagement with the teeth.

3. In a rake cleaner the combination with a rake comprising a handle and head having teeth thereon of a supporting bar, a plurality of stripping sleeves carried by said supporting bar and slidable on said teeth, an arm pivoted on said handle and operatively connected at one end with said supporting bar, a weight member carried upon the other end of said arm, said pivot for the arm being arranged intermediate the ends thereof, and means for limiting the movement of the arm carried upon said handle to prevent said stripping sleeves from moving out of engagement with the teeth.

4. The combination with a rake comprising a handle and a head having teeth thereon, said handle being bifurcated to provide a pair of arms at its secured end, a supporting bar, stripping members mounted upon said bar and operatively connected with said teeth, an arm pivoted intermediate its ends between the arms formed on said handle, one end of said last named arm being operatively connected with said supporting bar, and a weight formed on the other end of said arm.

5. The combination with a rake comprising a handle having a pair of spaced arms formed at one end and a head having teeth thereon operatively connected with the ends of said arms of cleaning means comprising a supporting bar, a plurality of stripping sleeves mounted upon and surrounding said teeth, an arm pivoted intermediate its ends between said first named arms, one end of said last named arms being operatively connected with said supporting bar, a weight formed at the other end of said last named arm, and a stop pin arranged transversely of the first named arms to engage said weight to limit the movement of said stripping sleeves.

In testimony whereof I affix my signature in presence of two witnesses.

HORACE WELCH.

Witnesses:
W. S. GILLIS,
J. PERCY DAY.